(12) United States Patent
Nikoloudakis et al.

(10) Patent No.: US 10,133,658 B1
(45) Date of Patent: Nov. 20, 2018

(54) GARBAGE COLLECTION FOR DATA STORAGE

(71) Applicant: Google LLC, Mountain View, CA (US)

(72) Inventors: Konstantinos Nikoloudakis, San Francisco, CA (US); Sven Koehler, Sunnyvale, CA (US); Danyao Wang, Kitchener (CA); Sahand Saba, Kitchener (CA); Long Fei, Campbell, CA (US); Simon Tyler Wise, New Hamburg (CA); David Halladay Schneider, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/614,871

(22) Filed: Jun. 6, 2017

(30) Foreign Application Priority Data

May 2, 2017 (GR) .............................. 20170100197

(51) Int. Cl.
*G06F 12/02* (2006.01)
*G06F 3/06* (2006.01)

(52) U.S. Cl.
CPC ........ *G06F 12/0223* (2013.01); *G06F 3/0652* (2013.01); *G06F 12/0238* (2013.01); *G06F 3/0608* (2013.01); *G06F 3/0649* (2013.01); *G06F 12/0253* (2013.01)

(58) Field of Classification Search
CPC ............. G06F 12/0253; G06F 12/0223; G06F 12/0238; G06F 3/0652; G06F 3/0608; G06F 3/0649
USPC ........................................................ 707/813
See application file for complete search history.

(56) References Cited

U.S. PATENT DOCUMENTS

| | | |
|---|---|---|
| 2009/0037479 A1 | 2/2009 | Bolik et al. |
| 2012/0029975 A1 | 2/2012 | Bisel |
| 2016/0070593 A1 | 3/2016 | Harris et al. |
| 2017/0091256 A1 | 3/2017 | Gordon et al. |
| 2017/0286288 A1* | 10/2017 | Higgins .............. G06F 12/0246 |
| 2017/0315753 A1* | 11/2017 | Blount .................. G06F 3/0649 |
| 2018/0052614 A1* | 2/2018 | Sawa .................... G06F 3/0611 |

OTHER PUBLICATIONS

International Search Report and Written Opinion issued in International Application No. PCT/US2018/013827, dated Jun. 15, 2018, 12 pages.

* cited by examiner

*Primary Examiner* — Than Nguyen
(74) *Attorney, Agent, or Firm* — Fish & Richardson P.C.

(57) ABSTRACT

Methods, systems, apparatus, including computer programs encoded on computer storage media, for reclaiming storage space in a storage environment. In one aspect, the method includes actions of aggregating data that is indicative of access to one or more data objects, determining a future storage cost associated with each of a plurality of data objects, determining an access window for each of the plurality of data objects, identifying a data object based on (i) the future storage cost that satisfies a predetermined threshold and (ii) a data object access window, providing a notification to a user device that requests feedback from a user indicating whether the data object can be deleted, and in response to receiving data that indicates that the data object can be deleted, generating an instruction to cause deletion of the data object upon the expiration of the access window.

20 Claims, 2 Drawing Sheets

GARBAGE COLLECTION FOR DATA STORAGE

CROSS-REFERENCE TO RELATED APPLICATION

This application claims priority to Greek Application No. 20170100197, filed May 2, 2017, the contents of which are incorporated by reference.

BACKGROUND

Garbage collection of data objects in storage poses significant challenges, especially as the scale (e.g., terabyte, petabyte, exabyte, or more) of data maintained in storage increases. Challenges are also introduced due to the complexity of the data structures (e.g., can contain millions of columns of more), and often limited knowledge about consumers and intended use of the data.

SUMMARY

According to one innovative aspect of the present disclosure, a computer-implemented method of reclaiming storage space in a big data storage environment is disclosed. The method may include actions of aggregating, by one or more server computers, data that is descriptive of access to data objects stored in a storage environment, determining, by the one or more server computers, a future storage cost associated with each data object of a plurality of data objects in the storage environment, determining, by the one or more server computers, an access window for each data object of the plurality of data objects in the storage environment, each access window having a respective expiration date in the future, identifying, by the one or more server computers, one or more first data objects, each of the first data objects being a data object for which the determined future storage cost satisfies a predetermined future storage cost threshold, for each identified first data object: providing, by the one or more server computers, a notification to user device that requests feedback from a user indicating whether the data object can be deleted after expiration of the access window, receiving, by the one or more server computers, data indicative of whether the data object can be deleted after expiration of the access window from the user device; and in response to receiving data that indicates that the data object can be deleted after expiration of the access window from the user device, generating an instruction to cause deletion of the data object upon the expiration of the access window.

Other aspects include corresponding systems, apparatus, and computer programs to perform the actions of methods defined by instructions encoded on computer storage devices.

These and other version may optionally include one or more of the following features. For instance, in some implementations, the method may further include in response to receiving data that indicates that the data object can be deleted after expiration of the access window from the user device, generating an instruction that instructs the storage environment to label the data object for deletion upon the expiration of the access window.

In some implementations, the method may further include in response to receiving data that indicates that the data object cannot be deleted after expiration of the access window from the user device, adjusting heuristics used to determine the access window.

In some implementations, aggregating, by the one or more server computers, data that is descriptive of access to the data objects stored in the storage environment may include: obtaining, by the one or more server computers, audit log data records from one or more audit logs maintained by the storage environment, wherein each audit log data record includes data that (i) identifies a data object that was accessed and (ii) a timestamp indicating when the access to the data object occurred, and storing, by the one or more server computers, the obtained audit log data records in a database.

In some implementations, determining, by the one or more server computers, an access window for each data object of the plurality of data objects in the storage environment may include analyzing, by the one or more server computers, the audit log data in the database to determine a period of time where the data object is likely to be accessed.

In some implementations, determining, by the one or more server computers, a future storage cost associated with each data object of the plurality of data objects in the storage environment may include: using one or more heuristics to estimate the potential future storage costs of the data object based on the predicted future depreciation of storage prices.

In some implementations, the method may also include sorting, by the one or more server computers, the one or more first data objects based on (i) the future storage cost that can be reclaimed for each respective data object, and (ii) a confidence score indicating whether or not each respective data object will be accessed outside of the access window.

In some implementations, the label may include a timestamp indicating a time when the access window of the data object expires.

The subject matter of the present disclosure provides multiple advantages over conventional methods. For example, features of the present disclosure optimize storage reclamation processes in a "big data" storage environment. In some implementations, for example, the present disclosure can make determinations regarding whether or not to reclaim storage space in a "big data" storage system based on a comparison of an estimated future storage cost of a data object to a cost of reclaiming storage space associated with the data object from the "big data" storage system. Such a cost-benefit analysis is unique to a "big data" storage system because the size of data objects may be extremely large. This optimizes a storage reclamation process by programming the process to determine that, in certain instances (e.g., where the cost to reclaim storage is greater than the estimated future storage cost), that it is more efficient to leave a data object stored in "big data" storage than to go through the necessary steps to reclaim the data—even when no user is expected to access the data object in the future. In some instances, therefore, it may be more efficient to leave a data object in "big data" storage as opposed to reclaiming the storage space associated with the "big data" object because, for example, the monetary cost of storage depreciates over time.

DETAILED DESCRIPTION

The present disclosure is directed towards a system and method that optimizes the use of storage resources in a storage environment relative to conventional storage systems that do not use the systems and methods described in this specification. In the example description that follows, the storage system is often referred to as a "big data" storage system, as the benefits and advantages realized increase in proportion to the scale of the amount of data stored in the storage system. However, the features described below can be used in any storage system, and thus are not limited to storage systems that may be classified as "big data" storage systems.

The system and method described by the present disclosure can optimize the use of storage resources in a storage environment by reclaiming storage space occupied by data objects in the storage environment that the system determines are no longer useful. A data object may be identified as a candidate for reclamation based on (i) a determination that the data object is likely to incur more than a threshold amount of future storage cost if kept in storage, and (ii) a determination that a predetermined access window associated with the data object has expired. A data object may exceed the threshold amount of storage cost if an estimated future storage cost is determined to be greater than the cost to remove the data object in the present. In some instances, the system and methods described by the present disclosure may also be used to reclaim storage space used to maintain an entire repository of data objects.

Figure 1:
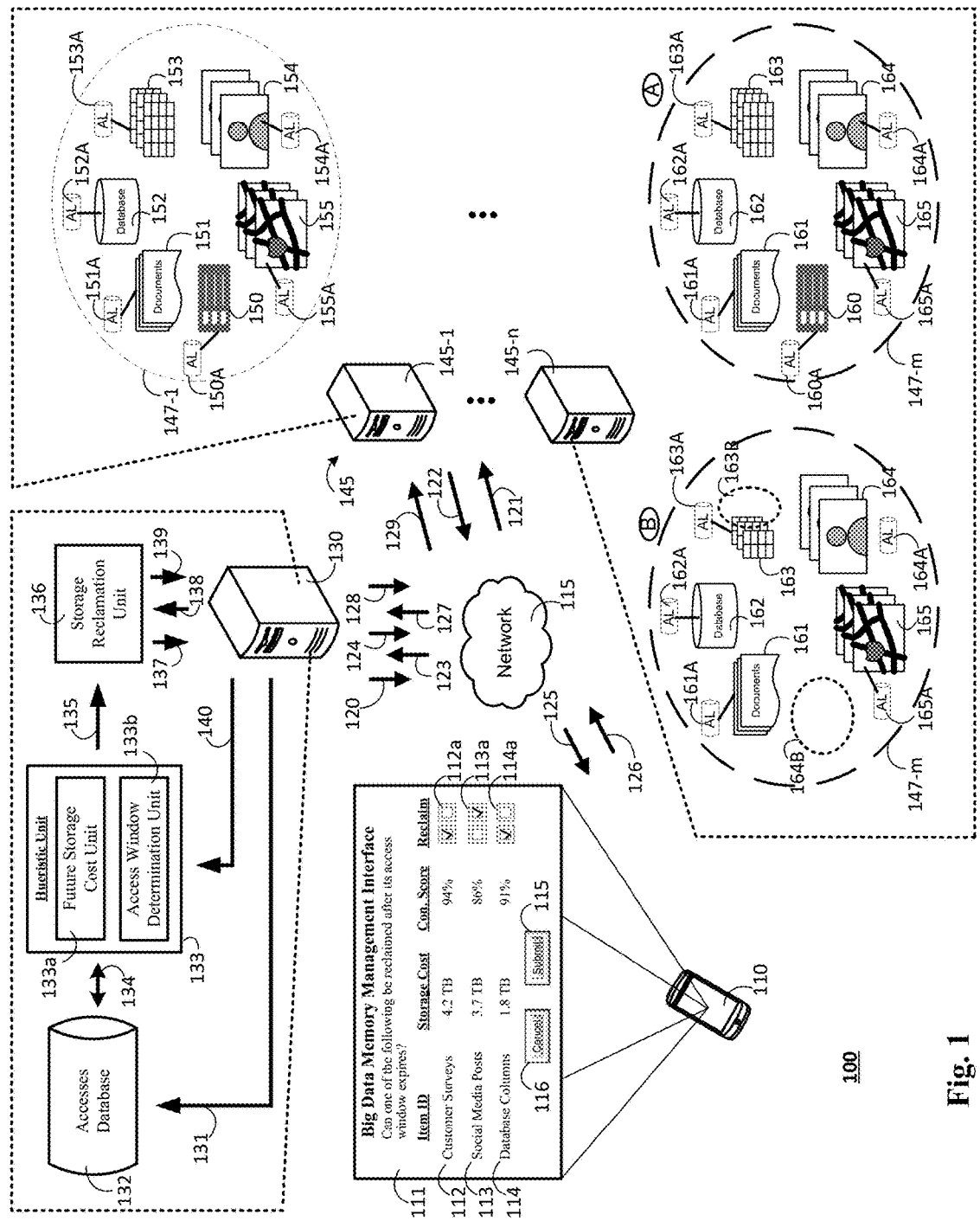
FIG. 1 is a contextual diagram of a system for reclaiming storage space in a storage environment.

FIG. 1 is a contextual diagram of a system 100 for reclaiming storage space in a storage environment. The system 100 includes a user device 110, a network 115, a server 130, and a storage environment 145. For purposes of illustration only, the storage environment 145 is referred to as a big data storage environment 145.

The big data storage environment 145 includes one or more server computers 145-1 to 145-$n$ that provide physical storage of data objects, wherein n is any positive integer. In some implementations, the big data storage environment 145 may be operated by a single entity and used to provide physical storage for multiple data object repositories 150, 151, 512, 153, 154, 155 that store data objects that are obtained, generated, maintained, or a combination thereof, by the single entity. Alternatively, the big data storage environment 145 may be a cloud-based system that provides physical storage for m entities, where m is any positive integer. In such a cloud-based system, the big data storage environment 145 may allocate storage space 147-1 to a first entity for use in storing the first entity's data object repositories 150, 151, 152, 153, 154, 155 and a different storage space 147-$m$ to a second entity for use in storing the second entity's data object repositories 160, 161, 162, 163, 164, 165.

An entity may include any person, group of persons, organization (e.g., a corporation, government agency, or the like), computer system (e.g., artificial intelligence agents), or the like that needs storage space to store data. By way of example, an entity such as an international retailer (hereafter "retailer") may require storage space to store big data. This example is depicted in FIG. 1 with reference to the storage space 147-$m$. At stage A, a retailer may use the storage space 147-$m$ to store multiple diverse types of data object repositories such as a repository of customer surveys 160, a repository of documents 161, relational database repository 162 storing sales data, a column database repository 163 storing inventory data, a repository of social media posts 164, and a repository of purchase location information 165. One or more agents, employees, or the like of the retailer may use one or more software tools provided by the big data storage environment to perform data analytic operations on the big data maintained by the data object repositories stored in storage space 147-$m$. For example, one or more data analytic algorithms may be employed to analyze the retailer's big data such as sales data, inventory data, customer purchase location information, and social media posts to identify or predict sales trends in one or more particular geographic regions. Alternatively, or in addition, such data analytic algorithms may be automated to run at predetermined time intervals, in response to particular events, or the like.

The big data storage environment 145 may maintain an audit log 160A, 161A, 162A, 163A, 164A, 165A for each respective data object repository such as data object repositories 160, 161, 162, 163, 164, 165 that are stored in the big data storage environment 145. Each respective audit log 160A, 161A, 162A, 163A, 164A, 165A may include a history of accesses to respective data objects in each respective data object repository with which the respective audit log 160A, 161A, 162A, 163A, 164A, 165A is associated. The history of accesses maintained by each respective audit log may include multiple data records that are generated by the big data storage environment 145 in response to each access of a data object. Each data record may include, for example, the data object that was accessed, type of access (e.g., read access, write access, or the like), and a timestamp. The time stamp may include the time of the access and the date of the access. In some implementations, each respective audit log 160A, 161A, 162A, 163A, 164A, 165A may maintain the data records representing access to the respective data objects in chronological order. The history of accesses maintained by the audit log 160A, 161A, 162A, 163A, 164A, 165A may be a complete history of accesses to respective data objects or an incomplete history of accesses to respective data objects.

Though the example of FIG. 1 shows multiple different audit logs that are each associated with a particular data object repository, the present disclosure need not be so limited. For example, each storage space 147-1 to 147-$m$ may have a single audit log that generates and stores audit log data records describing each access to a data object in the storage space. Alternatively, the big data storage environment 145 may include a single audit log that generates and stores data records describing each access to each data object in the big data storage environment 145. Other configurations of audit logs are also considered to fall within the scope of the present disclosure.

Over time, the big data storage environment 145 may accumulate vast amounts of data on the order of many terabytes, petabytes, exabytes, or even more. However, it is likely that less than all of the data maintained by the big data storage environment 145 is useful to an entity that is using the big data storage environment 145 to store the entity's big data. In some implementations, usefulness of data maintained by the big data storage environment 145 may be based on whether the data will be useful in the future (e.g., whether data is useful after a predetermined number of days).

The server 130 can be used to reclaim storage space occupied by one or more data objects stored in the big data storage environment 145. The server 130 includes an accesses database 132, a heuristic unit 133, a future storage cost analysis unit 133a, an access window determination unit 133b, and a storage reclamation unit 136. In this specification, the term "unit" will be used broadly to refer to a software or hardware based system or subsystem that can perform one or more specific functions. Generally, a unit will be implemented as one or more software modules or components, installed on one or more computers in one or more locations; in other cases, multiple units can be installed on the same computer or computers.

The server 130 aggregates data records from each of the audit logs maintained by the big data storage environment 145. For example, the server can transmit a request 120 for audit log data records via the network 115 that is received 121 by the big data storage environment 145. In response to the request, the big data storage environment 145 may return 122 to the server 130 via the network 115 audit log data records maintained by each audit log 150A, 151A, 152A, 153A, 154A, 155A, 160A, 161A, 162A, 163A, 164A, 165A for each storage space 147-1 to 147-*m* of the big data storage environment 145. The server 130 may receive 123 the audit log data records and store 131 the received audit log data records in the accesses database 132. The aggregated data records from each of the audit logs can be used by the server 130 to determine an access window for one or more data objects stored by the big data storage environment 145. The network 115 may include, for example, one or more of a LAN, a WAN, a cellular network, the Internet, or a combination thereof.

The server 130 may transmit multiple requests such as request 120 over time in an effort to keep the accesses database 132 updated. For example, the server 130 may be configured to periodically request data records from audit logs at predetermined intervals (e.g., hourly, daily, nightly, weekly, or the like.). Alternatively, or in addition, the server 130 may be configured to request data records from audit logs on demand (e.g., in response to a user instruction). Alternatively, or in addition the server 130 may be configured to obtain the data records from audit logs associated with one or more data objects prior to making a recommendation to a user of user device 110 to reclaim storage space storing the one or more data objects.

The server 130 includes a heuristic unit 133 that can be used to identify data objects that are candidates for storage reclamation. In some implementations, identifying data objects that are candidates for storage reclamation includes a two-part process of first using a future storage cost unit 133*a* to identify a first set of one or more data objects stored in the big data storage environment 145 having a future storage cost that satisfies a predetermined future storage cost threshold, and then determining an access window for each of the one or more data objects in the first set of data objects. Alternatively, in some implementations, the server 130 may receive data identifying a second set of one or more data objects that were previously determined to have a future storage cost that satisfies a predetermined future storage cost threshold, and then the server can determine an access window for each of the one or more data objects in the second set of data. Accordingly, in some implementations, it may not be necessary for the server 130 to determine a predicted future storage cost. Data identifying each data object of the first set of one or more data objects is provided 135 by the heuristic unit 133 to the storage reclamation unit 136.

The future storage cost unit 133*a* is configured to identify one or more data objects stored in the big data storage environment 145 that may be candidates for storage reclamation. A data object may be a candidate for storage reclamation if the future storage cost unit 133*a* predicts that the data object is associated with a future storage cost that satisfies a predetermined future storage cost threshold. The future storage cost unit 133*a* may determine the future storage cost for one or more data objects stored in the big data storage environment 145 based on the use of a series of heuristics that analyze one or more of a number of different factors. The factors may include, for example, the footprint of the data object, replication of the data object, retention of datasets containing the data objects, overall depreciation of storage price, feedback from entities responsible for oversight of the data objects (e.g., one or more agents, employees, computer systems (e.g., artificial intelligence agents), or the like from an entity using the big data storage environment to store the entity's big data), a combination thereof, or the like.

In some implementations, predicting a future storage cost for one or more data objects may include accessing 134 and analyzing audit log data records stored in the accesses database 132. The future storage cost unit 133*a* may predict a future storage cost for a respective data object based on trends detected in the historical accesses logged for the data object. In some instances, a higher future storage cost may be predicted for a data object (i) if, e.g., the aggregated audit logs indicate that the footprint for the data object is increasing, (ii) if, e.g., the data object is routinely replicated, (iii) if, e.g., data sets containing the data object are retained for indefinite periods of time, (iv) a combination thereof, (v) or the like.

In some instances, heuristics employed by the future storage cost unit 133*a* can predict a future storage cost by considering factors other than just the amount of storage space that a data object requires. For example, the future storage cost unit 133*a* may predict the future storage cost for a data object based on (i) the amount of storage space that a data object is predicted to require and (ii) an estimated depreciation in the price of storage space. Determining a predicted future storage cost for a data object as a function of both (i) future storage space required for data object and (ii) the depreciation in price of storage space provides a more accurate storage cost estimate in a big data storage environment 145 where storage is vast and additional storage can be readily added.

The future estimated storage cost for a data object may be expressed in terms of the amount of storage space that is required to maintain the data object. For example, the future estimated storage cost may be expressed using a unit of storage (e.g., the cost to maintain a particular data object may be a number of gigabytes (GB), terabytes (TB), petabytes (PB), exabytes (EB), or the like). Alternatively, the future estimated storage cost for a data object may be expressed in terms of an estimated amount of money (e.g., dollars, euros, or the like) it costs to continue storing the data, whether continued storage of the data object would exceed existing capacity, or the like. In some implementations, the unit of storage may be scaled proportionally based on the estimated depreciation in the future cost of storage. This scaled storage cost provides a user (e.g., an agent, employee, a computer system (e.g., artificial intelligence agent), or the like from an entity using the big data storage environment to store the entity's big data) with a more accurate estimated future storage cost.

Though the description of determining a future estimated storage cost is described with respect to a particular data object, the present disclosure need not be so limited. For example, the heuristic unit 133 may use the future storage cost unit 133*a* to determine the future storage cost for each data object in a repository of data objects. In such instances, the future storage cost for an entire repository of data objects may be determined by summing the future storage cost of each data object in a data storage repository. In some implementations, the heuristic unit 133 can identify an entire repository of data objects as a set of candidate data objects for storage reclamation if the repository's future storage cost satisfies a predetermined future storage cost threshold.

The access window determining unit 133b is configured to determine a period of time when a data object is likely to be accessed. The period of time when a data object is likely to be accessed may span, for example, a period of time that extends from the present (or past) time until a future time t. The server 130 can predict, based on the access window for a data object, that it is likely that the data object will not be accessed after time t.

The access window determining unit 133b may determine an access window for one or more data objects based the audit log data records stored in the accesses database 132. The access window determining unit 133b may access 134 the accesses database 132 and using one or more heuristics to estimate access windows of the one or more data objects. In some implementations, the access window determining unit 133b may analyze the aggregated audit log data records to detect trends in data object accesses. In some implementations, the access window determining unit 133b may analyze the audit log data records associated with a data object to determine a creation date of the data object. Then, the access window determination unit 133b may predict, based on the data object creation date and a future time t for the data object that is a predetermined amount of time in the future after the creation date. In some implementations, the access window determination unit 133b may set a future time t for the data object to be, e.g., four months, or more, from the creation of the data object.

Alternatively, or in addition, the access window determining unit 133b may consider other factors than data object access history established by audit log data records when determining an access window for a data object. For example, the access window determining unit 133b may determine an access window based on factors such as compliance with one or more data retention policy, compliance with one or more legal policies, or the like. In such instances, the access window determining unit 133b may determine to extend an access window for a data object even if the data object has not been accessed, may not be accessed, or the like in an effort to comply with the established policy.

Access windows may generally be determined for each data object. However, in some instances, if every data object in a data object repository is associated with a particular access window expiration date, then the latest access window expiration date associated with a data object in the data object repository may be used as an access window expiration date for the entire data object repository. The expiration date may include one or more of a particular day, a particular time, a particular day and time, or the like.

The access window determining unit 133b may determine a confidence score for each access window. The confidence score may be indicative of the likelihood that the data object associated with an access window will be accessed after the expiration date such as the end of the access window at time t. In some implementations, the confidence score may be based on access trends identified during the analysis of the audit log data records. Alternatively, or in addition, the confidence score may be based on the amount of time that exists between the current time and time t. The closer the current time is to time t, the higher the confidence score may be. Alternatively, or in addition, the confidence score may be based on whether or not a user (e.g., an agent, an employee, a computer system (e.g., artificial intelligence agent), or the like from an entity using the big data storage environment to store the entity's big data) has previously provided feedback indicating that the server 130 should not reclaim storage space associated with the data object. For example, a confidence score that a data object will accessed outside of a determined access window should be lower if the user has previously expressed a need for the data object even after expiration date associated with a particular access window. Such user feedback is indicative of a potential need by the user to keep the data object stored beyond the determined access window, a flaw in the heuristics used to determine the access window for the particular data object for which the user has provided feedback, or both.

The heuristic unit 133 may provide 135 data (i) identifying a set of one or more candidate data objects having a predicted future storage cost that satisfies a predetermined future storage cost threshold, (ii) a predicted future storage cost for each data object in the set of one or more candidate objects, (iii) an access window for each data object in the set of one or more candidate data objects, and (iv) a confidence score indicating the likelihood that each data object in the set of data objects will not be accessed once the predetermined access window expires. The storage reclamation unit 136 may sort the set of one or more candidate data objects based on the predicted future storage cost associated with each data object, the confidence score associated with each object, or both. In the example of FIG. 1, the heuristic unit 133 may have identified the customer survey repository 160, the social media post repository 164, and two columns of a column database 163 as being candidate data objects for having their storage space reclaimed.

The storage reclamation unit may then transmit 124 a notification to a user device 110 via a network 115 that is designed to prompt a user of the user device 110 to indicate whether or not storage space used to store one or more of the candidate data objects can be reclaimed. The user of the user device 110 may be an agent, employee, computer system (e.g., an artificial intelligence agent), or the like from an entity using the big data storage environment to store the entity's big data. In some implementations, the storage reclamation unit may transmit 124 a notification to prompt the user to indicate whether or not storage space used to store one or more of the candidate data objects can be reclaimed for each candidate data object. Alternatively, the storage reclamation unit may only transmit 124 notifications to prompt the user to indicate whether or not storage space used to store one or more candidate data objects can be reclaimed if the confidence score associated with the data object fails to satisfy a predetermined threshold. For those scenarios where the confidence score satisfies a predetermined threshold (e.g., based on prior feedback from the user), the storage reclamation unit may continue on with the storage reclamation process as if the user provided feedback indicating that the storage space for the candidate data object can be reclaimed at the expiration of the data object's access window.

The user device 110 receives 125 the notification and generates a graphical user interface 111 for display in the user interface of the user device 110 that prompts the user of the user device for feedback regarding potential storage space reclamation of storage space allocated for a set of one or more candidate data objects. In particular, the user interface may ask the user whether it is ok to reclaim the storage space allocated to one or more of the identified candidate data objects once the determined access window for the data object expires.

The user interface 111 may provide the user with the opportunity to provide input that is indicative of whether the user consents to the reclamation of storage for each candidate data object identified in the notification. In the example of FIG. 1, the notification may indicate that one or more candidate data objects including the customer surveys repository 112, the social media post repository 113, and two Database Columns 114 of a column database are candidates for having their storage space reclaimed. The user interface 111 may provide data associated with each of the one or more candidate data objects for display such as a data object identifier, a predicted future storage cost, and a confidence score that indicates the likelihood that the data object will be accessed after the access window for the candidate data object expires. In some implementations, the user interface 111 may also provide data indicating the access window time period that is associated with each candidate data object.

The user interface 111 may allow the user to indicate whether the user approves of reclaiming the storage space associated with each respective data object. For example, the user can toggle a set of checkboxes 112a, 113a, 114a to indicate which of the one or more candidate data objects 112, 113, 114 the user thinks should have its storage space reclaimed and which of the one or more candidate data objects should not have their storage reclaimed. In the example of FIG. 1, the user may use the checkboxes 112a, 113a, 114a to indicate that the storage space for the one or more candidate data objects 112 and 114 should be reclaimed and that the storage space for the candidate data objects 114 should not have its storage space reclaimed. In some implementations, the user may select the "submit" icon 115 to transmit 126 the user's selection as user feedback to the server 130 via the network 115. Alternatively, the user may discard the user's selections by selecting the "cancel" icon 116.

The server 130 receives 127 the user feedback from the user device 110. The server 130 may provide 138 the user's feedback to the storage reclamation unit 136. The storage reclamation unit 136 processes the user's feedback and determines whether the storage space for each of the one or more candidate data objects can be reclaimed.

For those candidate data objects such as the social media post repository 164 that the user indicated should not have their storage space reclaimed, the storage reclamation unit 136 decides to de-prioritize the data object for storage reclamation consideration. De-prioritizing the data object for storage reclamation may include labeling the data object with data indicating that the data object can be bypassed by the heuristic unit 133 for consideration as a candidate data object for storage space reclamation. In some implementations, the label may include data indicating that the data object should only be bypassed for a predetermined amount of time. Alternatively, in other implementations, the label may include data indicating that the data object should be permanently bypassed by the heuristic unit 133 for consideration as a candidate data object, based on the user's feedback.

The server 130 also provides 140 the user feedback to the heuristic unit 133. The heuristic unit 133 may process the user feedback and use the user feedback indicating a user's decision to not reclaim storage space allocated to a particular data object as a factor in determining future storage costs for data objects. Alternatively, or in addition, the user feedback indicating a user's decision to not reclaim storage space may subsequently be used as a factor in determining an access window for one or more data object in the future.

On the other hand, for those candidate data objects such as the customer surveys repository 160 and the one or more database columns of column database 160 that the user indicated should have their storage space reclaimed upon expiration of each respective data object's access window, the storage reclamation unit 136 can generate and output 139 an instruction that instructs the big data storage environment 145 to reclaim data storage allocated to the customer survey repository 160 and two database columns of the column database repository 163 upon the expiration of the each respective data object's access window.

The server 130 may transmit 128 the instruction generated by the storage reclamation unit 136 to the big data storage environment 145 via the network 115. The big data storage environment 145 may receive 129 and process the instruction from the server 130. In response to the instruction received 129 from the server 130, the big data storage environment 145 labels each data object identified by the received instruction with an expiration label that includes the expiration time t of the access window that is associated with each respective data object. The big data storage environment 145 may monitor the expiration labels of data objects stored by the big data storage environment 145. Then, the big data storage environment 145 can reclaim the storage space allocated to the labeled data objects at the future time indicated by a labeled data object's expiration label.

By way of example, the big data storage environment 145 can label the customer survey repository 160 and two of the columns of the column database 163 with respective labels based on the instruction received from the server 130. Then, upon detection of the respective times indicated by the expiration label associated with the customer survey repository's and the expiration label associated with two of the columns of the column database 163, the big data storage environment may delete the customer survey repository 160 and the two columns of the column database 163. Note that the expiration time t for each respective data object was previously determined by the access window determination unit and can include different times or the same time for each data object.

In FIG. 1, the storage space 147-$m$ is shown at stage B, which occurs at some point in time after the time indicated by each of the respective labels associated with the customer survey repository 160 and two of the columns of the column database 163 has expired. The storage space 147-$m$ shows that the customer service repository and two of the columns of the column database have been reclaimed by deleting the customer service repository and two of the columns of the column database. The reclaimed storage space associated with each of the customer service repository and two of the columns of the column database is shown as 164B and 163B, respectively.

Figure 2:
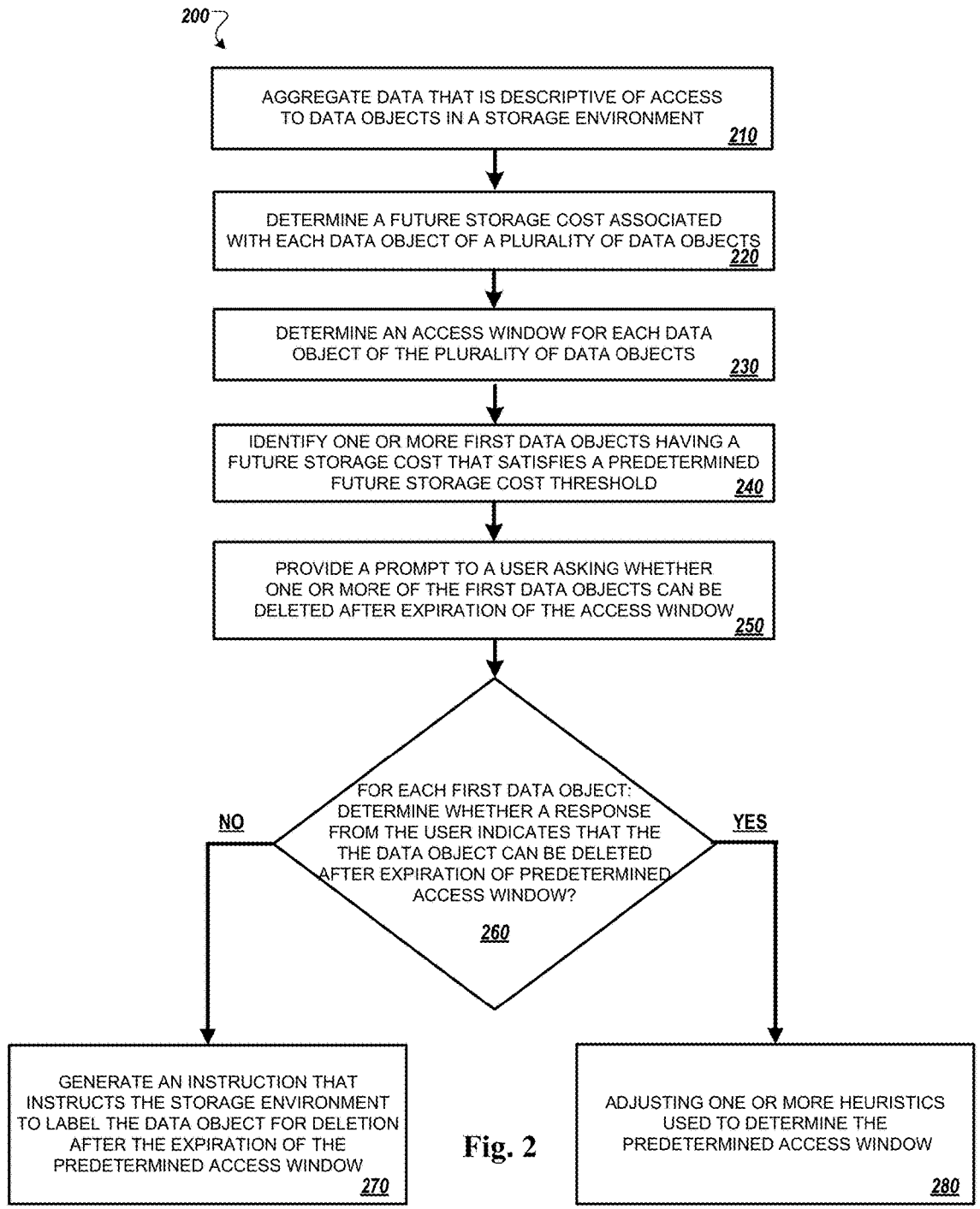
FIG. 2 is a flowchart of a process for reclaiming storage space in a storage environment.

FIG. 2 is a flowchart of a process 200 for reclaiming storage space in a storage environment. For convenience, the process 200 will be described as being performed by a system of one or more computers located in one or more locations. For example, a system such as the system 100 can be appropriately programmed in accordance with this specification to perform the process 200. Though the process 200 may be performed on any storage environment, for purposes of the description of FIG. 2, the storage environment is referred to as a big data storage environment.

The process 200 begins with the system aggregating 210 data that is indicative of access to one or more data objects stored in a big data storage environment. Aggregating data that is descriptive of access to data objects stored in the big data storage environment may include, for example, the system obtaining data records stored by one or more audit logs associated with each data object stored in the big data storage environment. The system may obtain data records stored by the audit log by transmitting a request for audit log data records to each audit log maintained by the big data storage environment. In response to the request, the system may receive one or more audit log data records maintained by each respective audit log. The system may receive the audit log data records and store the received audit log data records in an accesses database. Each respective audit log may include data that indicates a data object that was accessed, the type of access, and a time stamp indicating when the access took place. The aggregated data records from each of the audit logs can be used by the system to determine an access window for one or more data objects stored by the big data storage environment.

The system may transmit multiple requests for audit log data records over time in an effort to keep the accesses database up to date. For example, the system may be configured to periodically request data records from audit logs at predetermined intervals (e.g., hourly, daily, nightly, weekly, or the like.). Alternatively, or in addition, the system may be configured to request data records from audit logs on demand (e.g., in response to a user instruction). Alternatively, or in addition, the system may be configured to obtain the data records from audit logs associated with one or more data objects prior to making a recommendation to a user of a user device that the storage space allocated to one or more data objects may be suitable for reclamation.

The system determines 220 a future storage cost associated with each data object of a plurality of data objects in the big data storage environment. The system may determine a future storage cost for one or more data objects in the big data storage environment using one or more heuristics that consider a variety of factors such as the footprint of the data object, replication of the data object, retention of datasets containing the data objects, overall depreciation of storage price, feedback from entities responsible for oversight of the data object. Entities responsible for oversight of the data object may include, for example, an agent, an employee, or the like from an entity using the big data storage environment to store the entity's big data, a combination thereof, or the like.

In some implementations, predicting a future storage cost for one or more data objects may include the system accessing and analyzing the audit log data records aggregated at stage 210 and stored in the accesses database. The system may predict a future storage cost for a respective data object based on trends detected in the historical accesses logged for the data object. By way of example, a higher future storage cost may be predicted for a data object if, for example, the aggregated audit logs indicate that the footprint for the data object is increasing, if the data object is routinely replicated, if data sets containing the data object are retained for indefinite periods of time, a combination thereof, or the like.

In some implementations, the system may predict a future storage cost by using heuristics that consider factors other than just the amount of storage space that a data object requires. For example, the system may predict the future storage cost for a data object based on (i) the amount of storage space that a data object is predicted to require and (ii) an estimated depreciation in the price of storage space. Determining a predicted future storage cost for a data object as a function of both (i) an amount of future storage space required for the data object and (ii) the depreciation in price of storage space provides a more accurate storage cost estimate in a big data storage environment 145 where storage is vast and additional storage can be readily added.

The system determines 230 an access window for each of the plurality of data objects in the big data storage environment. The access window may include a period of time when a data object is likely to be accessed. A determined access window may span, for example, a period of time that extends from the present (or past) time until a future time t. The future time t may be referred to as an expiration date of the access window. The expiration date may include one or more of a particular day, a particular time, a particular day and time, or the like. The system may determine an access window by accessing the accesses database and using one or more heuristics to estimate an access window of one or more data objects based on the audit log data records aggregated and stored in the accesses database.

In some implementations, the system may analyze the aggregated audit log data records for each data object stored in the big data storage environment to detect trends in data object accesses. For example, the system may analyze the audit log data records associated with a data object to determine a creation date of the data object. The creation date may be determined by detecting the audit data log data record representative of the first write operation associated with the data object. Then, the system may predict, based on the data object creation date specified by one or more audit log data records in the access database, a future time t for the data object that is a predetermined amount of time in the future after the creation date of the data object. In one implementation, the system may set a future time t for the data object to be four months, or more, from the creation of data the object.

The system may generally determine an access window for each data object in the big data storage environment. However, in some instance, the access window of individual data objects may be used to determine an access window for an entire repository of data objects. For example, if every data object in a data object repository is associated with a particular access window expiration time, then at any particular point in time, the latest access window expiration time may be used as an access window expiration time for the entire data object repository.

The system identifies 240 one or more first data objects that are candidates for having their storage reclaimed based on a future storage cost. In some implementations, the system may also identify the one or more first data objects based on an access window. For example, identifying the first data object may include identifying one or more data objects that (i) are associated with a future storage cost that satisfies a predetermined future storage cost threshold, and (ii) are not likely to be accessed outside of the access window for the data object. The predetermined future storage cost threshold may be set to a cost threshold that balances estimated benefits of reclaiming the storage space associated with the one or more first data objects and the computational resource cost (e.g., CPU usage, memory usage, bandwidth consumption, system downtime to perform reclamation, or the like) that must be expended to reclaim the storage space. In such instances, if a determined future storage cost for a data object satisfies a predetermined future storage cost threshold, then the benefit of reclaiming storage space associated with the data object is greater than the cost of computational resources that are expended to reclaim the storage space associated with the data object. In such a scenario, the system may reclaim the storage space associated with the data object. Similarly, if a determined future storage cost for a data object does not satisfy a predetermined future storage cost threshold, then the benefit of reclaiming storage space associated with the data object is less than the computational resources that are expended to reclaim the storage space associated with the data object. In such instances, the system may not reclaim the storage space associated with the data object.

The system may sort the one or more first data objects based on the potential future storage cost that can be reclaimed if the one or more first data objects are deleted, a confidence score associated with the access window, or both. The confidence score associated with the access window may be indicative of the likelihood that the data object associated with an access window will be accessed after the expiration of the end of the access window at time t.

The system provides a notification that includes a prompt 250 to a user device that asks whether one or more of the first data objects can be deleted after expiration of the access window for the respective data object. In some implementations, the system only generates a notification to the user for a subset of the first data objects. The subset of the first data objects may include the set of data objects that are most likely to be approved for storage reclamation. Data objects that are most likely to be reclaimed may include those data objects with the largest potential cost savings. The user of the user device may be an agent, employee, computer system (e.g., artificial intelligence agent), or the like from an entity using the big data storage environment to store the entity's big data. The notification may be provided for display in the user interface of the user device.

The displayed notification may provide the user with the opportunity to provide input that is indicative of whether the user consents to the reclamation of storage for each candidate data object identified in the notification. The user interface may provide data associated with each of the one or more candidate data objects for display such as a data object identifier, a predicted future storage cost, and a confidence score that indicates the likelihood that the data object will be accessed after the access window for the candidate data object expires, or the like. In some implementations, the user interface may also provide data indicating the access window time period that is associated with each candidate data object.

The user interface allows the user to input data that indicates whether the user approves of reclaiming the storage space associated with each respective data object associated with the notification. For example, the user can toggle a set of checkboxes to indicate which of the one or more candidate data objects the user thinks should have its storage reclaimed at the expiration of each candidate data object's access window and which of the one or more candidate data objects should not have their storage reclaimed at the expiration of each candidate data object's access window. In some implementations, the user may select a "submit" icon to transmit the user's selection(s) as user feedback to the server via the network. Alternatively, the user may discard the user's selection(s) by selecting the "cancel" icon.

The system receives the user's feedback and determines 260, for each data object of the first data objects identified in the prompt to the user, whether a response received from the user indicates that the data object can be deleted after expiration of the access window associated with the data object. In response to determining at stage 260 that the user indicated that the data object can be deleted at the expiration of the data object's access window, the system generates 270 an instruction that instructs the big data storage environment to label the data object for deletion upon the expiration of the access window. Alternatively, in response to determining at stage 260 that the user indicated that the data object cannot be deleted at the expiration of the data object's access window, the system adjusts one or more heuristics used to determine the storage cost, access window, or both.

A data object may be described generally as a unit of stored data whose storage space can be reclaimed. In the context of a big data storage environment, a data object may include structured data such as one or more columns in a database that may comprise multiple columns (e.g., hundreds of columns, thousands of columns, millions of columns, or even more). By way of another example, a data object may include, for example, a storage bucket in a key-value based storage system. Alternatively, or in addition, a big data storage environment may also include data objects that include unstructured data items. Examples of unstructured data objects may include, for example, one or more social media posts, one or more customer surveys, one or more documents, or the like.

A repository may be generally described as a group of multiple data objects of a similar type. For example, a repository in a big data storage environment may include structured data such as a database of multiple columns (e.g., hundreds of columns, thousands of columns, millions of columns, or even more). Alternatively, or in addition, a big data storage environment may also include repositories of unstructured data items. For example, a repository of unstructured data items may include a storage space storing an entire collection of social media posts, a storage space storing an entire collection of customer surveys, a storage space storing a collection of documents, or the like.

"Big data" is understood to describe data sets that are so large and complex that traditional data processing application software is inadequate to store, organize, search, and analyze the data sets. Generally, "big data" may currently have a scale that measures in the realm of hundreds of terabytes, multiple petabytes, multiple exabytes, or more and include structured data, unstructured data, or both. However, as time progresses, "big data" systems may be capable of storing data on even greater scales. A "big data" storage environment may include, one or more server computers that provides physical storage and software tools necessary to store, maintain, search, retrieve, and analyze "big data." Moreover, such a "big data" storage environment includes software tools for performing the aforementioned operations in order to infer conclusions from "big data." Alternatively, or in addition, "big data" may be characterized based on attributes such as volume, velocity, variety, and veracity.

The volume attribute refers to the amount of data that a storage environment maintains. A storage environment is more likely to be a "big data" storage environment if, for example, the storage environment maintains large volumes of data on the order of several terabytes, petabytes, exabytes, or more.

The velocity attribute refers to the rate at which new data items are being generated. A storage environment is more likely to be a "big data" storage environment if, for example, a large amount of new data items are being generated and stored. Some "big data" storage environments may, for example, generate or receive new data for every stock trade, every social media post, every sales transaction, every customer survey completed, every change in inventory data, every email message transmitted or received, or the like.

The variety attribute refers to the number of different types of sources that generate diverse types of data stored in the storage environment. A storage environment is more likely to be a "big data" storage environment if, for example, a diverse set of devices is generating the data that is maintained by the storage environment. For example, a "big data" storage environment may maintain data that is generated by one or more server computers, desktop computers, laptop computers, smart phones, tablets, connected appliances, smart watches, other wearables, rfid tags, other sensors, or the like. Alternatively, or in addition, a storage environment is more likely to be a "big data" storage environment if, for example, the storage environment maintains diverse types of data such as event data detected by event processing systems, financial transaction data, sales data, inventory data, social media posts, security camera video or images, health data, device location information, purchase location data, and the like.

The veracity attribute refers to the reliability of the data stored in the storage environment. A storage environment is more likely to be a "big data" storage environment if, for example, the data that is maintained by the storage environment includes data that varies in its reliability. The reliability of "big data" may vary due to the large volume of unfiltered data that is received and maintained by the "big data" storage environment.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A computer-implemented method comprising:
   aggregating, by one or more server computers, data that is descriptive of access to data objects stored in a storage environment;
   determining, by the one or more server computers, a future storage cost associated with each data object of a plurality of data objects in the storage environment;
   determining, by the one or more server computers, an access window for each data object of the plurality of data objects in the storage environment, each access window having a respective expiration date in the future;
   identifying, by the one or more server computers, one or more first data objects, each of the first data objects being a data object for which the determined future storage cost satisfies a predetermined future storage cost threshold;
   for each identified first data object:
      providing, by the one or more server computers, a notification to user device that requests feedback from a user indicating whether the data object can be deleted after expiration of the access window;
      receiving, by the one or more server computers, data indicative of whether the data object can be deleted after expiration of the access window from the user device; and
      in response to receiving data that indicates that the data object can be deleted after expiration of the access window from the user device, generating an instruction to cause deletion of the data object upon the expiration of the access window.

2. The computer-implemented method of claim 1, the method further comprising:
   in response to receiving data that indicates that the data object can be deleted after expiration of the access window from the user device, generating an instruction that instructs the storage environment to label the data object for deletion upon the expiration of the access window.

3. The computer-implemented method of claim 1, the method further comprising:
   in response to receiving data that indicates that the data object cannot be deleted after expiration of the access window from the user device, adjusting heuristics used to determine the access window.

4. The computer-implemented method of claim 1, wherein aggregating, by the one or more server computers, data that is descriptive of access to the data objects stored in the storage environment includes:
   obtaining, by the one or more server computers, audit log data records from one or more audit logs maintained by the storage environment, wherein each audit log data record includes data that (i) identifies a data object that was accessed and (ii) a timestamp indicating when the access to the data object occurred; and
   storing, by the one or more server computers, the obtained audit log data records in a database.

5. The computer-implemented method of claim 4, wherein determining, by the one or more server computers, an access window for each data object of the plurality of data objects in the storage environment includes:
   analyzing, by the one or more server computers, the audit log data in the database to determine a period of time where the data object is likely to be accessed.

6. The computer-implemented method of claim 1, wherein determining, by the one or more server computers, a future storage cost associated with each data object of the plurality of data objects in the storage environment includes:
   using one or more heuristics to estimate the potential future storage costs of the data object based on the predicted future depreciation of storage prices.

7. The computer-implemented method of claim 1, further comprising:
   sorting, by the one or more server computers, the one or more first data objects based on (i) the future storage cost that can be reclaimed for each respective data object, and (ii) a confidence score indicating whether or not each respective data object will be accessed outside of the access window.

8. A system comprising:
one or more computers and one or more storage devices storing instructions that are operable, when executed by one or more computers, to cause the one or more computers to perform the operations comprising:
aggregating, by one or more server computers, data that is descriptive of access to data objects stored in a storage environment;
determining, by the one or more server computers, a future storage cost associated with each data object of a plurality of data objects in the storage environment;
determining, by the one or more server computers, an access window for each data object of the plurality of data objects in the storage environment, each access window having a respective expiration date in the future;
identifying, by the one or more server computers, one or more first data objects, each of the first data objects being a data object for which the determined future storage cost satisfies a predetermined future storage cost threshold;
for each identified first data object:
providing, by the one or more server computers, a notification to user device that requests feedback from a user indicating whether the data object can be deleted after expiration of the access window;
receiving, by the one or more server computers, data indicative of whether the data object can be deleted after expiration of the access window from the user device; and
in response to receiving data that indicates that the data object can be deleted after expiration of the access window from the user device, generating an instruction to cause deletion of the data object upon the expiration of the access window.

9. The system of claim 8, the operations comprising:
in response to receiving data that indicates that the data object can be deleted after expiration of the access window from the user device, generating an instruction that instructs the storage environment to label the data object for deletion upon the expiration of the access window.

10. The system of claim 8, the operations comprising:
in response to receiving data that indicates that the data object cannot be deleted after expiration of the access window from the user device, adjusting heuristics used to determine the access window.

11. The system of claim 8, wherein aggregating, by the one or more server computers, data that is descriptive of access to the data objects stored in the storage environment includes:
obtaining, by the one or more server computers, audit log data records from one or more audit logs maintained by the storage environment, wherein each audit log data record includes data that (i) identifies a data object that was accessed and (ii) a timestamp indicating when the access to the data object occurred; and
storing, by the one or more server computers, the obtained audit log data records in a database.

12. The system of claim 11, wherein determining, by the one or more server computers, an access window for each data object of the plurality of data objects in the storage environment includes:
analyzing, by the one or more server computers, the audit log data in the database to determine a period of time where the data object is likely to be accessed.

13. The system of claim 8, wherein determining, by the one or more server computers, a future storage cost associated with each data object of the plurality of data objects in the storage environment includes:
using one or more heuristics to estimate the potential future storage costs of the data object based on the predicted future depreciation of storage prices.

14. The system of claim 8, the operations further comprising:
sorting, by the one or more server computers, the one or more first data objects based on (i) the future storage cost that can be reclaimed for each respective data object, and (ii) a confidence score indicating whether or not each respective data object will be accessed outside of the access window.

15. A non-transitory computer-readable medium encoded with instructions that, when executed by or more computers, cause the one or more computers to perform the operations comprising:
aggregating, by one or more server computers, data that is descriptive of access to data objects stored in a storage environment;
determining, by the one or more server computers, a future storage cost associated with each data object of a plurality of data objects in the storage environment;
determining, by the one or more server computers, an access window for each data object of the plurality of data objects in the storage environment, each access window having a respective expiration date in the future;
identifying, by the one or more server computers, one or more first data objects, each of the first data objects being a data object for which the determined future storage cost satisfies a predetermined future storage cost threshold; for each identified first data object:
providing, by the one or more server computers, a notification to user device that requests feedback from a user indicating whether the data object can be deleted after expiration of the access window;
receiving, by the one or more server computers, data indicative of whether the data object can be deleted after expiration of the access window from the user device;
in response to receiving data that indicates that the data object can be deleted after expiration of the access window from the user device, generating an instruction to cause deletion of the data object for deletion upon the expiration of the access window.

16. The computer-readable medium of claim 15, the operations comprising:
in response to receiving data that indicates that the data object can be deleted after expiration of the access window from the user device, generating an instruction that instructs the storage environment to label the data object for deletion upon the expiration of the access window.

17. The computer-readable medium of claim 15, the operations comprising:
in response to receiving data that indicates that the data object cannot be deleted after expiration of the access window from the user device, adjusting heuristics used to determine the access window.

18. The computer-readable medium of claim 15, wherein aggregating, by the one or more server computers, data that is descriptive of access to the data objects stored in the storage environment includes:

obtaining, by the one or more server computers, audit log data records from one or more audit logs maintained by the storage environment, wherein each audit log data record includes data that (i) identifies a data object that was accessed and (ii) a timestamp indicating when the access to the data object occurred; and storing, by the one or more server computers, the obtained audit log data records in a database.

19. The computer-readable medium of claim 18, wherein determining, by the one or more server computers, an access window for each data object of the plurality of data objects in the storage environment includes:

analyzing, by the one or more server computers, the audit log data in the database to determine a period of time where the data object is likely to be accessed.

20. The computer-readable medium of claim 15, wherein determining, by the one or more server computers, a future storage cost associated with each data object of the plurality of data objects in the storage environment includes:

using one or more heuristics to estimate the potential future storage costs of the data object based on the predicted future depreciation of storage prices.

\* \* \* \* \*